United States Patent [19]

Satoh et al.

[11] Patent Number: 4,799,208

[45] Date of Patent: Jan. 17, 1989

[54] OPTICAL RECORDING AND REPRODUCING APPARATUS HAVING ERASING FUNCTIONS WITH CONTROLLABLE ERASING BEAM INTENSITY

[75] Inventors: Isao Satoh, Neyagawa; Makoto Ichinose, Sakai; Yoshihisa Fukushima, Osaka; Yuzuru Kuroki, Toyonaka; Yuuji Takagi, Neyagawa, all of Japan

[73] Assignee: Matsushita Electric Industrial Co., Ltd., Osaka, Japan

[21] Appl. No.: 915,576

[22] Filed: Oct. 3, 1986

[30] Foreign Application Priority Data

Oct. 8, 1985 [JP] Japan ................. 60-224548
Oct. 8, 1985 [JP] Japan ................. 60-224548

[51] Int. Cl.$^4$ ............................ G11B 7/125
[52] U.S. Cl. ................... 369/100; 369/112; 369/122
[58] Field of Search ........... 369/100, 109, 112, 122; 365/113

[56] References Cited

U.S. PATENT DOCUMENTS

| | | | |
|---|---|---|---|
| 4,426,693 | 1/1984 | Satoh et al. | 369/116 X |
| 4,509,156 | 4/1985 | Ohara et al. | 369/116 X |
| 4,554,652 | 11/1985 | Maeda et al. | 369/116 X |
| 4,566,088 | 1/1986 | Yoshida et al. | 365/113 X |
| 4,598,395 | 6/1986 | Smith | 369/100 |
| 4,656,079 | 4/1987 | Yamada et al. | 369/100 |
| 4,679,184 | 7/1987 | Yoshida et al. | 369/112 |

FOREIGN PATENT DOCUMENTS

60-263351 12/1985 Japan .

Primary Examiner—Aristotelis M. Psitos
Attorney, Agent, or Firm—Stevens, Davis, Miller & Mosher

[57] ABSTRACT

A data recording and reproducing apparatus is disclosed in which an optical disc for recording, reproducing or erasing data is radiated with an erasing light beam and a recording-reproducing light beam sequentially to record or reproduce the data with the recording-reproducing light beam and erase the data with the erasing light beam. In rewriting the data, the erasing light beam is radiated in advance of the recording-reproducing light beam on a data section of the disc, and the old data is erased by temperature increase and annealing by the erasing light beam, while new data is recorded by temperature increase and quenching with the recording-reproducing light beam set to the recording light intensity. After recording the new data, the light intensity of the erasing light beam is gradually decreased and turned off. In rewriting the sector data, the erasing light beam is radiated on the data section in advance of the recording-reproducing light beam, and by the temperature increase and annealing with the erasing light beam, the old data is erased, while new data is recorded by temperature increase and quenching with the recording-reproducing light beam set to the recording light intensity. After recording the new data, the light intensity of the erasing light beam is turned off after being modulated for a predetermined time. By doing so, the process of the temperature and quenching is eliminated which otherwise might be required at the time of turning off the erasing light beam, thereby preventing occurrence of a recording trace and a defect of the recording medium by a thermal shock.

9 Claims, 5 Drawing Sheets

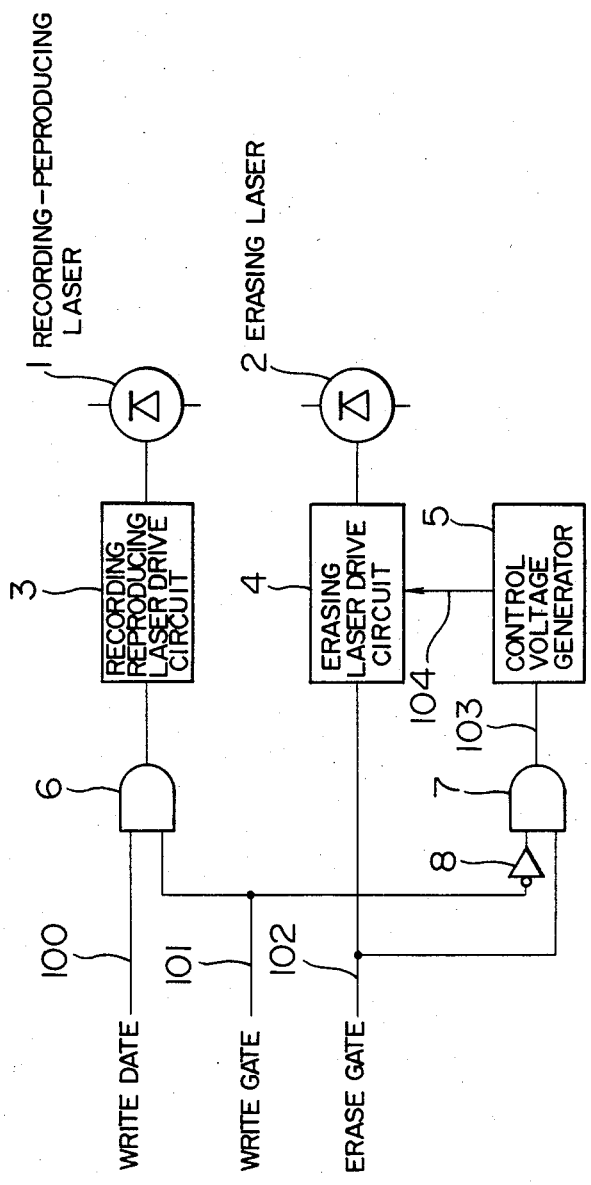
F I G. 1

OPTICAL RECORDING AND REPRODUCING APPARATUS HAVING ERASING FUNCTION WITH CONTROLLABLE ERASING BEAM INTENSITY

BACKGROUND OF THE INVENTION

The present invention relates to a data recording and reproducing apparatus, or more in particular, to a data recording and reproducing apparatus in which data is capable of being recorded or reproduced on the one hand and is capable of being erased on the other hand with a laser beam radiated on an optical disc.

FIG. 5 shows a phase change between an amorphous state A and a crystal state C of a phase-changed recording medium of a conventional data recording and reproducing apparatus. The reflection factor is small in the amorphous state A, and high in crystal state C. The crystal state C is reached when the temperature of a medium is increased locally to almost the melting point and the particular part is annealed, whereas the crystal state A is attained when the temperature of the part in the crystal state C is locally increased to almost the melting point followed by quenching. FIG. 6 is a diagram showing the principle of recording and reproduction for explaining the signal recording and reproduction operation. FIG. 6 (a) shows a construction of a light beam for realizing the condition for temperature increase followed by quenching and temperature increase followed by annealing of the medium. FIG. 6 (b) shows a light distribution for that purpose. In FIG. 6, reference numeral 9 designates a recording-reproducing light beam with small diameter, numeral 12 a distribution thereof, numeral 10 an erasing light beam with long diameter, and numeral 13 a light distribution thereof. Numeral 11 designates a guide track formed by evaporation with the recording medium. The difference in light beam diameter is such that the conditions for temperature increase followed by quenching are set up with a short diameter, and the conditions for temperature increase followed by annealing are established with a long diameter. FIG. 6 (c) shows waveforms of reproduction signals from an identifier section (hereinafter referred to as "the ID section"), a data section and a gap section of a sector formed in the guide track 11 of the optical disc.

FIG. 6 (d) shows a write gate signal 105 for setting the recording and reproducing light beam in a recording mode and commanding the writing by modulating it with a write data into the data section, and FIG. 6 (e) an erasing gate signal 106 for controlling the period of time during which the erasing light beam 10 is radiated on the data section of the guide track 11 with a predetermined intensity. In the data section, the write gate signal 105 and the erasing gate signal are enabled so that the data section is erased with the preceding erasing light beam 10, and the write data is recorded by the succeeding recording-reproducing light beam 9. At the end of the data recording, the write gate signal 105 and the erasing gate signal 106 are both turned off.

In the above-mentioned configuration, the write gate signal 105 and the erasing gate signal 106 are turned off at the same time, and therefore, the operation of writing in the medium is effected with the erasing light beam 10 in the manner shown by 14 of FIG. 6 (c).

The medium is erased by increasing the temperature and annealing by the erasing light beam 10. This process of temperature increase followed by annealing is realized as a whole function including the peak at the leading portion and the uniform distribution 13 at the rear portion of the erasing light beam 10. The very instant the erasing gate signal 106 is turned off, therefore, at the leading portion of the distribution 13 of the erasing light beam 10, the portion of the medium beyond the recording threshold light power Pt meets the conditions for temperature increase and quenching thereby to render the recording as shown by a recording trace 14 in view of the fact that the light at the rear portion of the erasing light beam 10 in the distribution 13 is turned off and is not radiated.

This recording trace 14, which is a jitter caused by the eccentricity of the disc or the rotation variations thereof, varies from several tens of microns to 100 microns in position. Further, since the preceding recording traces are erased only partially, it makes up a signal having much DC components 10 microns wide after a multiplicity of erasures. As a result, the reproduction signal has a waveform distortion such as zag caused by DC component change in the gap, thus posing the problem that the ID section of the next sector cannot be read with high accuracy. Also, the erasing light beam 10, which is radiated all the time, has a higher average power than the recording power modulated, and therefore if it is turned off suddenly as explained above, a thermal shock is exerted on the medium. As a consequence, at the turned-off portion of the erasing light beam 10, the effect of the thermal expansion caused in the recording medium of the data section of the sector causes a separation from the base material of the recording film, or the repetitive recording and erasure causes a conspicuous thermal fatigue thereby to deteriorate the recording-reproduction characteristics.

SUMMARY OF THE INVENTION

In view of the aforementioned points, the object of the present invention is to provide a data recording and reproducing apparatus which is free of a recording trace or a defect by the erasing light beam in the rear gap of the data section of the sector.

According to the present invention, there is provided a data recording and reproducing apparatus comprising means for radiating an erasing light beam and a recording-reproducing light beam sequentially on an optical disc for recording and reproducing or erasing the data by sector, means for recording or reproducing the data with a recording-reproducing light beam, means for erasing the data with the erasing light beam, and means for reducing and controlling the light intensity of the erasing light beam with time.

According to another aspect of the present invention, there is provided a data recording and reproducing apparatus comprising means for radiating an erasing light beam and a recording-reproducing light beam sequentially on an optical disc for recording and reproducing or erasing the data by sector, means for recording or reproducing data with the recording reproducing light beam, means for erasing the data with the erasing light beam, and means for modulating and controlling the light intensity of the erasing light beam.

According to the present invention, by use of the aforementioned configuration, in the process of rewriting data in the sector, the erasing light beam is radiated on the data section in advance of the recording-reproducing light beam, and the temperature increase followed by annealing is effected by the erasing light beam thereby to erase the old data, so that the temperature increase followed by quenching is effected with the recording-reproducing light beam set at a recording light intensity thereby to record new data. At the end of the recording of the new data, the light intensity of the erasing light beam is modulated and turned off, and in this manner, the recording trace which may be caused at the time of turning off the erasing light eliminated on one hand, and the DC component of the recording trace occurred is reduced on the other hand, while at the same time reducing the thermal shock thereby to prevent a defect.

BRIEF DESCRIPTION OF THE DRAWINGS

FIG. 1 is a block diagram showing a data recording and reproducing apparatus according to a first embodiment of the present invention.

DESCRIPTION OF THE PREFERRED EMBODIMENTS

Figure 2:
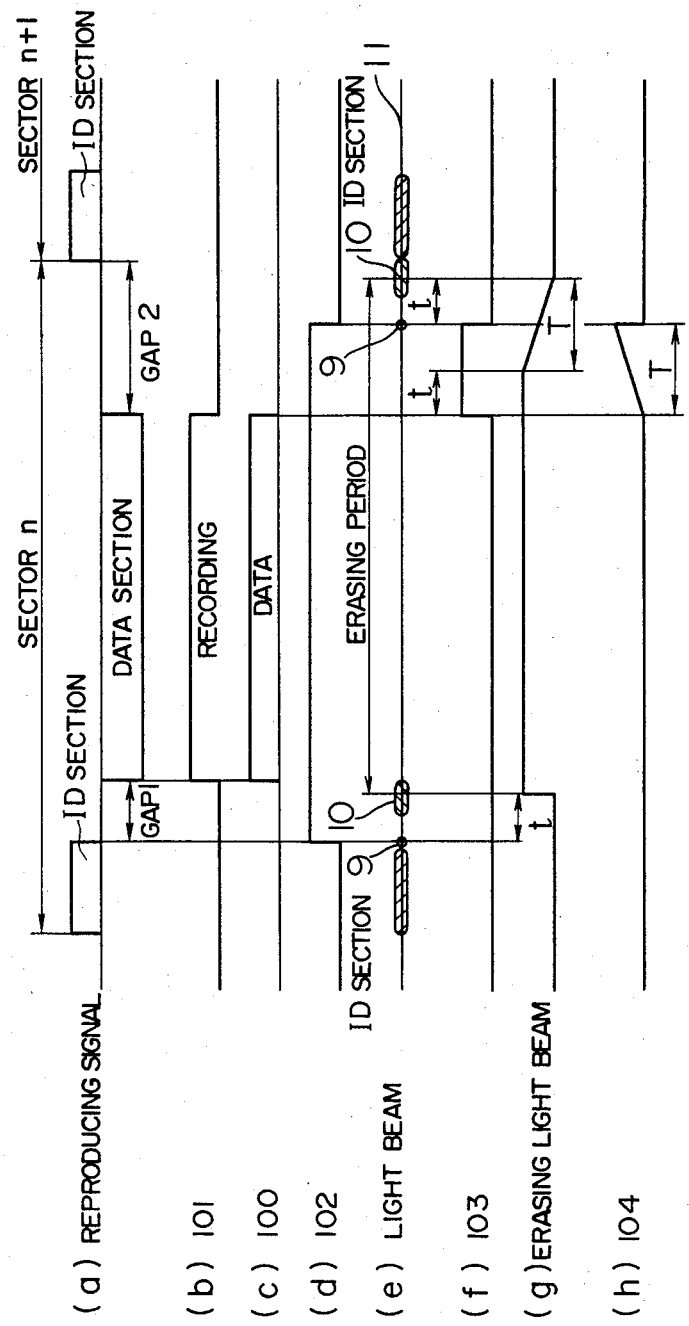
FIG. 2, (a)–(h), shows operation waveforms produced from the circuit shown in FIG. 1.

A block diagram of a data recording and reproducing apparatus according to a first embodiment of the present invention is shown in FIG. 1. In FIG. 1, reference numeral 1 designates a recording-reproducing laser beam, numeral 2 an erasing laser beam, numeral 3 a recording-reproducing laser drive circuit, numeral 4 an erasing laser drive circuit, numeral 5 a control voltage generator circuit for controlling the light intensity at the time of turning off the erasing laser beam, numerals 6 and 7 AND gates, and numeral 8 an inverter. Numeral 100 designates a write data signal, numeral 101 a write gate signal, numeral 102 an erase gate signal, numeral 103 an erase power control gate signal, and numeral 104 an erase power variable signal.

Operation waveforms of the circuit of FIG. 1 are shown in FIG. 2. In FIG. 2, numeral 9 designates a recording-reproducing light beam, numeral 10 an erasing light beam, and numeral 11 a guide track.

FIG. 2 (a) shows a waveform of a reproduction signal, in which character n designates a sector including an ID section, a gap 1, a data section and a gap 2. A write data signal is shown in FIG. 2 (b), a write gate signal in FIG. 2 (c) and an erase gate signal in FIG. 2 (d). FIG. 2 (e) is a diagram showing relative positions of the erasing light beam 10 and the recording-reproducing light beam 9 on the guide track 11, FIG. 2 (f) an erase power control gate signal, FIG. 2 (g) a light output level of the erasing light beam 10, and FIG. 2 (h) a waveform of the erase power variable signal.

The operation of the data recording and reproducing apparatus according to the present embodiment configured as above will be explained below.

Now, take as an example the case in which the data section of the sector n is rewritten.

Upon detection of the ID section of the sector n, the erase gate signal 102 is produced, and after the lapse of the time corresponding to the gap 1, the write gate signal 101 and the write data signal 100 are produced. As shown in FIG. 2 (e), the erasing light beam 10 is advanced by the time t from the recording-reproducing light beam 9. As a result, the old data section is increased in temperature and annealed by the erasing light beam 10 into the amorphous state A, that is, the erased state (levels of the gaps 1 and 2). The erasing gate signal 102 is applied to the erase laser drive circuit 4 thereby to light the erasing laser 2 with a predetermined light output. The write data signal 100 and the write gate signal 101 are applied through the AND gate 6 to the reproduction laser drive circuit 3, so that the recording-reproducing laser is modulated at the level of the recording light intensity thereby to record the data by temperature increase followed by quenching.

Upon completion of data recording, the write gate signal 101 turns off. The write gate signal 101 is inverted through the inverter 8 and the erase power control gate signal 103 (FIG. 2 (f)) is generated by the erasing gate signal 102 from the AND gate 7 (FIG. 2 (f)). The signal 103 is converted into the erase power variable signal 104 (FIG. 2 (h)) at the control voltage generator circuit 5. The erase power variable signal 104 is applied to the erasing laser drive circuit 4 thereby to control the light output of the erasing laser 2 by gradually reducing it and turning it off during the time T as shown in FIG. 2 (g).

The light intensity of the erasing light beam 10, which is set to a predetermined output level during radiation of the data section as shown in FIG. 2 (g), is reduced and turned off gradually in monotonous manner during the time T after the data recording. The waveform of the erase power variable signal 104 during this time period T may take a linear form, exponential function or a stepped form. The erasing laser 2 may be turned off when it is reduced sufficiently below the recording threshold value Pt of the medium. By turning off the erasing laser 2 by the power control sequence in this way, the conditions requiring temperature increase and quenching of the erasing light beam 10 are eliminated.

Figure 3:
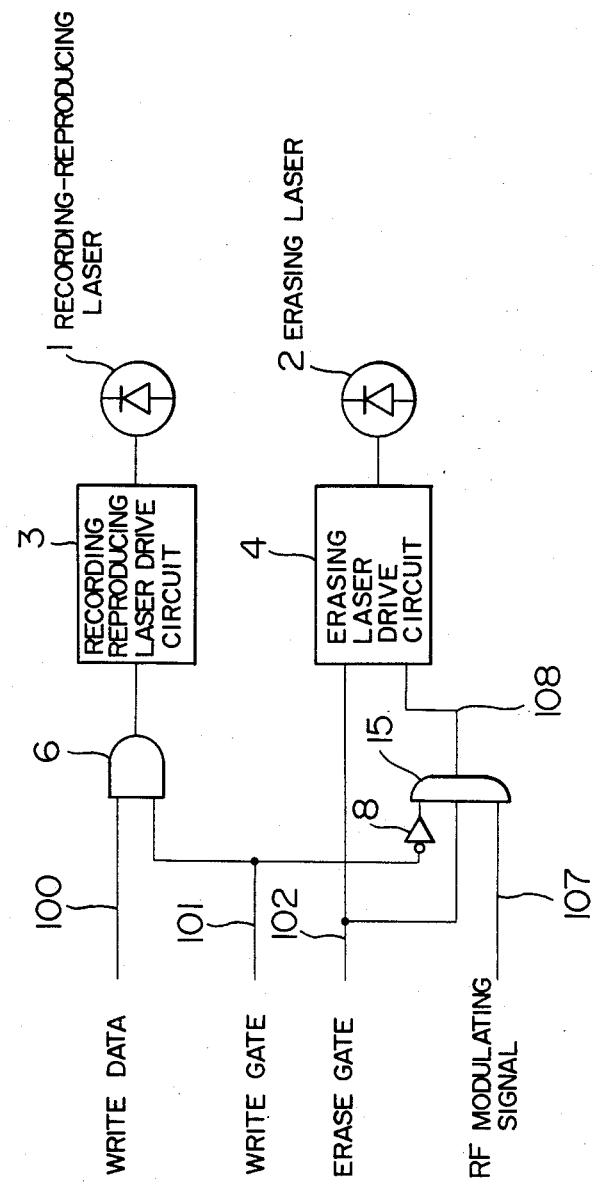
FIG. 3 is a block diagram showing a data recording and reproducing apparatus according to a second embodiment of the present invention.

FIG. 3 is a block diagram showing a data recording and reproducing apparatus according to a second embodiment of the present invention. In FIG. 3, numerals 1 to 4, 6, 8 and 100 to 102 designate the same component elements as those in FIG. 1 denoted by the same reference numerals. Numeral 15 designates a three-input AND gate, numeral 107 a modulation signal, and numeral 108 an erase power modulation signal of the erasing laser drive circuit 4.

Figure 4:
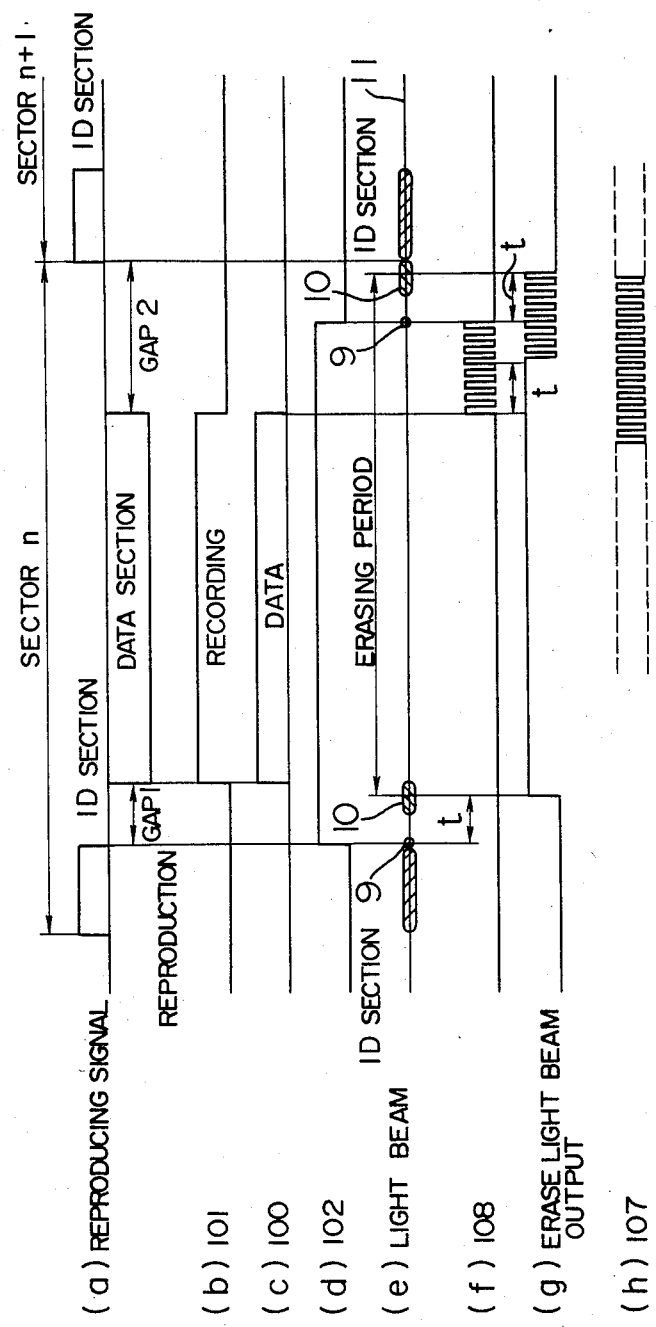
FIG. 4, (a)–(h), operation waveforms produced from the circuit of FIG. 3.
Figure 5:
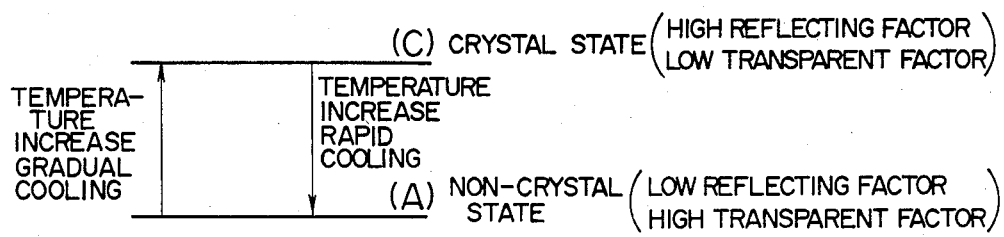
FIG. 5 is a diagram for explaining the recording, reproduction and erasure in connection with the phase change between the amorphous state A and the crystal state C of a phase-changed recording medium of a conventional data recording and reproducing apparatus.
Figure 6:
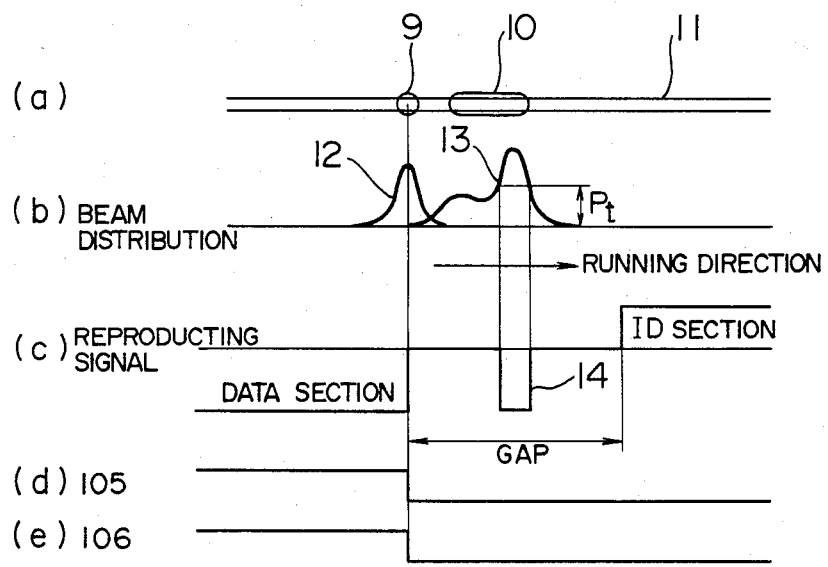
FIG. 6, (a)–(e), is a diagram showing the principle of recording and reproduction for explaining the signal recording and reproducing operation; in which (a) shows a configuration of a light beam, (b) a light distribution thereof, (c) a waveform of the light disc reproducing signal, (d) a write gate signal, and (e) an erasing gate signal.

FIG. 4 shows operation waveforms produced from the circuit of FIG. 3. (a) to (e) of FIG. 4 correspond to (a) to (e) respectively of FIG. 2, and show the same waveforms. FIG. 4 (f) shows an erase power modulation signal 108, FIG. 4 (g) a light output of the erasing light beam 10, and FIG. 4 (h) a waveform of the modulation signal 107.

The operation of the data recording and reproducing apparatus according to a second embodiment of the present invention configured as mentioned above will be explained below.

Explanation will be made with reference to the case in which the data section of the sector n is rewritten.

Upon detection of the ID section of the sector n, the erasing gate signal 102 is produced, and after the time associated with the gap 1, the write gate signal 102 and the write data signal 100 are produced. As shown in FIG. 4 (e), the erasing light beam 10 is advanced by time t from the recording-reproducing light beam 9. As a result, the old data section is increased in temperature and annealed by the erasing light beam 10 into the amorphous state A, that is, the erased state (level of gaps 1 and 2). The erasing gate signal 102 is applied to the erasing laser drive circuit 4 thereby to light the erasing laser 2 with a predetermined light output. The write data signal 100 and the write gate signal 101 are applied through the AND gate 6 to the recording-reproducing laser drive circuit 3 thereby to modulate the recording-reproducing laser 1 with the recording light intensity level, thus recording the data by temperature increase followed by quenching.

Upon completion of the data recording, the write gate signal 101 is turned off. The write gate signal 101 is inverted in the inverter 8, so that the erase power modulation signal 108 (FIG. 4 (f)) is generated from the erasing gate signal 102, the modulation signal 107 and the AND gate 15, which signal 108 is applied to the erasing laser drive circuit 4, and the light output of the erasing laser 2 is thus controlled by being turned off and modulated with high frequency during the period of time T as shown in FIG. 4 (g).

The light intensity of the erasing light beam 10 is set to a predetermined output level during radiation of the data section as shown in FIG. 4 (g), and during the period of time T after data recording, turned off by being modulated with a high frequency. A frequency meeting the conditions for temperature increase followed by annealing is used for the erase power modulation signal 108 during the time T. In this way, by turning off the erasing laser beam 2 by power modulation as mentioned above, the average intensity of the erasing light beam 10 is reduced by half, so that the medium is subjected to the conditions for temperature increase followed by annealing instead of the temperature increase followed by quenching. Also, even when the conditions for temperature increase followed by quenching occur, the recording traces turns into dots, thereby remarkably reducing the DC component. Further, if the duty factor of the modulation signal is continuously changed by a variable frequency oscillator for power modulation, on the other hand, it is possible to reduce the average intensity of the erasing light beam 10 gradually.

Furthermore, when the output of the recording-reproducing light beam changes from the recording to reproducing state, an excessive power may be generated by the transient switching phenomenon of the laser drive circuit, thereby often giving a thermal shock to the recording medium as at the time of turning off the erasing beam. In such a case, as in the second embodiment, the transient power may be dampened by pulse modulation of the output of the recording-reproducing light beam when the recording-reproducing light beam changes from the recording to reproducing state.

It will thus be understood from the foregoing description that according to the present invention, the control for gradual reduction of the light intensity of the erasing light beam and the control by modulation of the light intensity of the erasing light beam gradually reduce the laser power and alleviate the thermal shock on the recording medium at the time of turning off the erasing light beam, thereby making it possible to prevent separation of the recording film from the base material. As a consequence, a great practical effect is obtained by permitting an increased number of recording erasures in the recording medium and facilitating signal processing.

What is claimed is:

1. A data recording and reproducing apparatus comprising means for radiating an erasing light beam and a recording-reproducing light beam sequentially on an optical disc to record and reproduce and erase data, means for recording and reproducing data with said recording-reproducing light beam, means for erasing data with said erasing light beam, said erasing means radiating a data recording section of said disc with said erasing light beam, and means responsive to the termination of a recording interval for reducing the average intensity of said erasing light beam during a period of time following said recording interval termination after which period said erasing light beam is turned off.

2. An optical recording and reproducing apparatus in which a recording light beam is radiated on a surface of a running recording medium to change the recording medium between a crystal state and an amorphous state and on which a recording signal is optically and reversibly recorded in the form of a change of optical characteristic, said apparatus comprising:
   an erasing light source providing an erasing light beam;
   a recording/reproducing light source providing a recording/reproducing light beam;
   radiating means for radiating the erasing light beam from said erasing light source and the recording-/reproducing light beam from said recording/reproducing light source respectively and sequentially on the surface of the running recording medium;
   recording/reproducing means for recording or reproducing a signal with the recording/reproducing light beam;
   erasing means for erasing the signal recorded by said recording/reproducing means with the erasing light beam; and
   erasing light source output control means for controlling with time the intensity of said erasing light beam, said control means allowing said radiating means to radiate the erasing light beam simultaneously with at least said recording/reproducing light beam during the recording time interval when the signal is recorded and, in response to a termination of said recording interval, to turn off the erasing light beam by gradually reducing the intensity of the erasing light beam with time.

3. A data recording and reproducing apparatus according to claim 2, wherein the output of said recording-reproducing light beam changes from the recording state into reproducing state by being pulse-modulated in said recording-reproducing means.

4. An apparatus according to claim 2 wherein said erasing light beam runs on the recording medium in advance of said recording/reproducing light beam and said control means turns off said erasing light beam by gradually reducing its intensity after the time when said recording/reproducing light beam is changed from a recording state to a reproducing state.

5. An apparatus according to claim 2 wherein said control means produces an erasing gate signal and said recording/reproducing means produces a write gate signal, and after the time when said write gate signal is turned off, said control means operates such that the intensity of said erasing light beam is gradually reduced with time and after the lapse of a predetermined time, said erasing gate signal is turned off and said erasing light beam is turned off.

6. An optical recording and reproducing apparatus in which a recording light beam is radiated on a surface of a running recording medium to change the recording medium between a crystal state and an amorphous state and on which a recording signal is optically and reversibly recorded in the form of a change of optical characteristic, said apparatus comprising:
- an erasing light source providing an erasing light beam;
- a recording/reproducing light source providing a recording/reproducing light beam;
- radiating means for radiating the erasing light beam from said erasing light source and the recording/reproducing light beam from said recording/reproducing light source respectively and sequentially on the surface of the running recording medium;
- recording/reproducing means for recording or reproducing a signal with the recording/reproducing light beam;
- erasing means for erasing the signal recorded by said recording/reproducing means with the erasing light beam; and
- erasing light source output control means for controlling with time the intensity of said erasing light beam, said control means allowing said radiating means to radiate the erasing light beam simultaneously with at least said recording/reproducing light beam during the recording time interval when the signal is recorded and, in response to a termination of said recording interval, to on-off modulate said erasing light beam with a high frequency signal during a first predetermined period of time following which said erasing beam is turned off.

7. A data recording and reproducing apparatus according to claim 6 wherein the output of said recording-reproducing light beam changes form the recording state into reproducing state by being pulse-modulated in said recording-reproducing means.

8. An apparatus according to claim 6 wherein said erasing light beam runs on the recording medium in advance of said recording/reproducing light beam and said control means modulates the intensity of said erasing light beam after the time when said recording/reproducing light beam is changed from a recording state to a reproducing state.

9. An apparatus according to claim 6 wherein said control means produces an erasing gate signal and said recording/reproducing means produces a write gate signal, and after the time when said write gate signal is turned off, said control means operates such that said erasing light beam is modulated with time and after the lapse of a predetermined time, said erasing gate signal is turned off and said erasing light beam is turned off.

* * * * *